United States Patent [19]
Walter et al.

[11] Patent Number: 5,324,469
[45] Date of Patent: Jun. 28, 1994

[54] METHOD OF MAKING SINGLE WOOD CONCRETE LAYER SOUND ABSORPTION PANEL

[75] Inventors: Hansruedi Walter; Leni M Walter-Gurzeler, both of Windsor, S.C.

[73] Assignee: Insul Holz-Beton Systems, Inc., Windsor, S.C.

[21] Appl. No.: 935,288

[22] Filed: Aug. 26, 1992

[51] Int. Cl.$^5$ .............................. B28B 1/08; B28B 3/00
[52] U.S. Cl. ...................................... 264/234; 264/71; 264/333; 264/336; 264/345; 264/DIG. 43
[58] Field of Search ................... 264/333, 71, 69, 115, 264/336, DIG. 43, 345, 234

[56] References Cited

U.S. PATENT DOCUMENTS

| | | |
|---|---|---|
| 3,393,261 | 7/1968 | Herzig et al. . |
| 3,492,385 | 1/1970 | Simunic . |
| 3,959,422 | 5/1976 | Wilhelm .......................... 264/336 X |
| 3,965,020 | 6/1976 | Noll et al. ....................... 264/333 X |
| 3,979,217 | 9/1976 | Sutton ............................. 264/333 X |
| 4,229,393 | 10/1980 | Wesche et al. .................. 264/333 X |
| 4,325,457 | 4/1982 | Docherty et al. . |
| 4,427,610 | 1/1984 | Murray ............................. 264/333 X |
| 4,695,494 | 9/1987 | Fowler, Jr. et al. ............ 264/333 X |
| 4,786,450 | 11/1988 | Weidemann ..................... 264/333 X |
| 4,868,039 | 9/1989 | Lehan .............................. 264/333 X |
| 4,902,348 | 2/1990 | Kossatz et al. .................. 264/333 X |
| 4,917,838 | 4/1990 | Rensen et al. ................... 264/336 X |
| 5,019,170 | 5/1991 | Walter et al. . |
| 5,076,986 | 12/1991 | Delvaux et al. ................ 264/333 X |
| 5,154,874 | 10/1992 | Koslowski ........................... 264/333 |
| 5,683,390 | 2/1986 | Gelbman ......................... 264/336 X |

FOREIGN PATENT DOCUMENTS

| | | | |
|---|---|---|---|
| 8300613 | 9/1984 | Netherlands ........................ 264/336 |
| 2034631 | 6/1980 | United Kingdom ................ 264/333 |

Primary Examiner—Karen Aftergut
Attorney, Agent, or Firm—Oblon, Spivak, McClelland, Maier & Neustadt

[57] ABSTRACT

A single wood concrete layer, sound absorption panel is formed as a single wood concrete layer, cast panel body of kaolin mineralized organic fiber chips encased in Portland cement with steel reinforcement. The panels have a noise reduction coefficient of at least about 0.85 for a panel thickness of about 10 cm and a panel density of 86.5 kg/m$^2$.

6 Claims, 2 Drawing Sheets

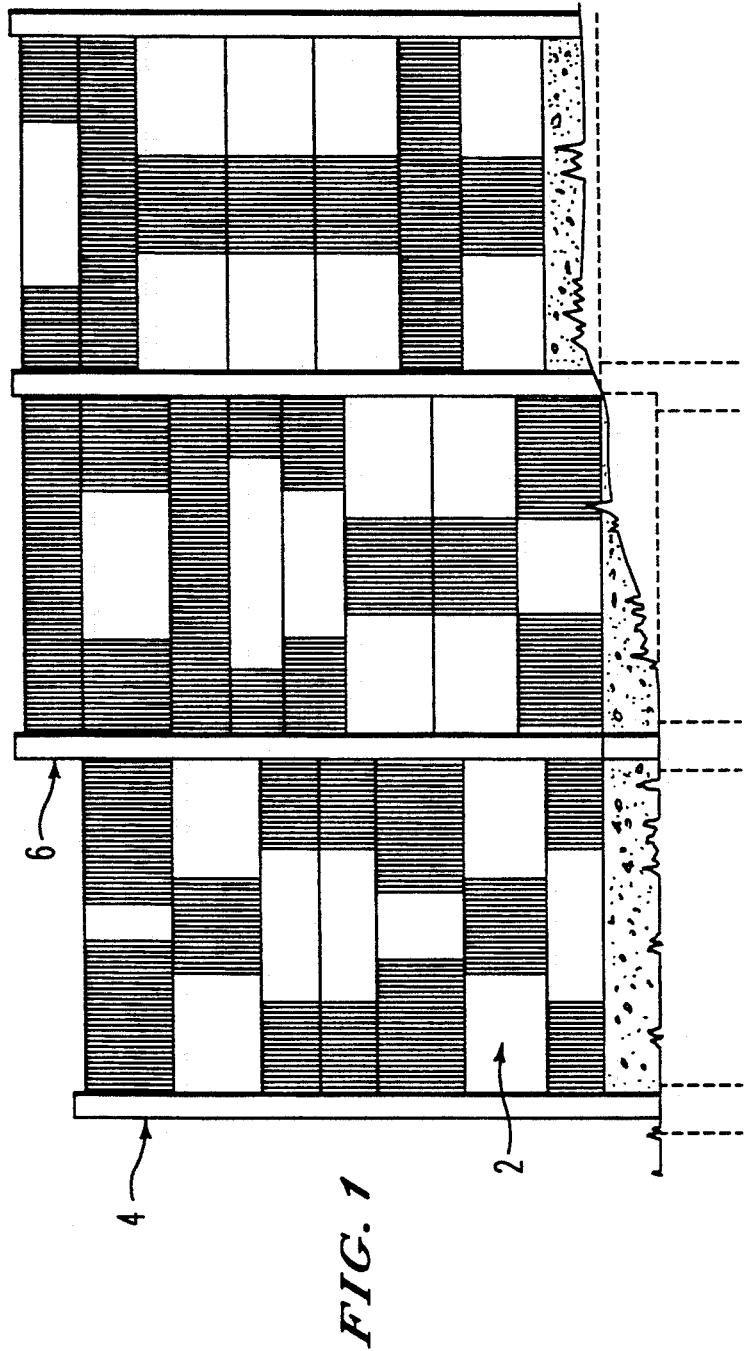
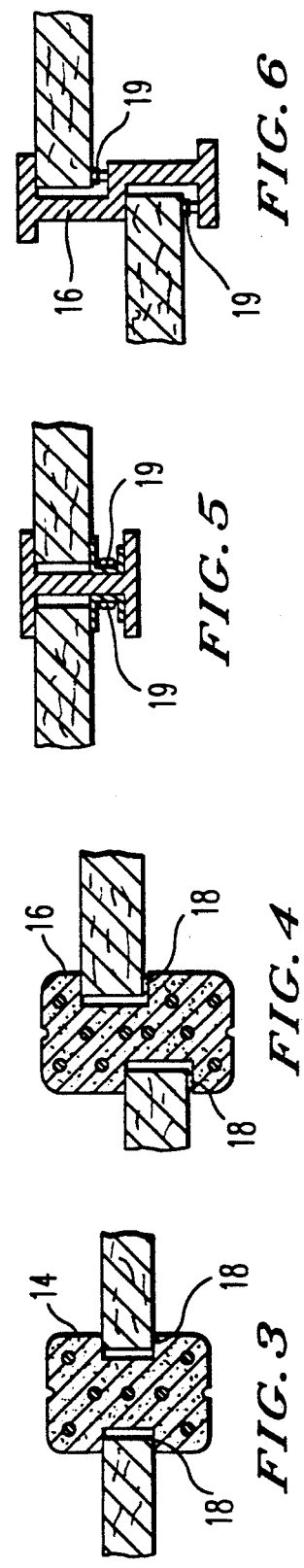

METHOD OF MAKING SINGLE WOOD CONCRETE LAYER SOUND ABSORPTION PANEL

BACKGROUND OF THE INVENTION

1. Field of the Invention

The present invention is directed to a single layer sound absorption panel of the type which can be used in a sound barrier wall adjacent a highway or other noise source.

2. Background of the Related Art

U.S. Pat. No. 4,325,457 discloses an acoustical barrier formed of two concrete layers joined as a laminate. According to this U.S. Patent, a single concrete layer panel provides inferior results as compared to a two layer panel, and so it provides a first concrete layer comprising mineralized fibrous material blended with cement, and a second concrete layer comprising a fine aggregate concrete. The resulting panel has a thickness of 10 cm and a density of approximately 20 lbs/ft$^2$, and provides a noise reduction coefficient of about 0.72.

Applicants have previously invented a free aggregate of wood pinchips, and a process for forming the free aggregate, as disclosed in their U.S. Pat. No. 5,019,170, which is hereby incorporated by reference into the present application. The disclosed process, known as the K-X treatment, mineralizes organic fibrous materials by encasing the individual chips in a kaolin mineralizing coating to a degree sufficient to seal in water soluble organic matter held in pores of the chips to prevent the leaching thereof, while maintaining the individual chips in a free aggregate form. The resulting free aggregate can then be mixed with Portland cement to form lightweight "wood concrete".

SUMMARY OF THE INVENTION

It is an object of the invention to provide a single layer sound absorption panel having light weight and a high noise reduction coefficient.

It is a further object of the invention to provide a process for producing a single wood concrete layer sound absorption panel having light weight and a high noise reduction coefficient and a small sound transmission loss.

According to a feature of the invention, the above and other objects are achieved by a single wood concrete layer sound absorption panel comprising a single wood concrete layer cast panel body of kaolin mineralized organic fiber chips encased in Portland cement, and reinforcement means encased in the panel body. More particularly, the single wood concrete layer sound absorption panel comprises a single wood concrete layer cast panel body of a kaolin mineralized organic fiber chip aggregate cast in Portland cement, and steel reinforcements encased in the body panel, wherein for a panel having a thickness of about 10 cm and a density of about 84.8–86.5 kg/m$^2$ the noise reduction coefficient (NRC) is at least about 0.85.

According to the process of the invention, a single wood concrete layer sound absorption panel having a noise reduction coefficient of at least about 0.85 is produced by the steps of forming a mixture of a free aggregate of kaolin mineralized organic fiber chips with Portland cement and water, casting the mixture into a mold of a lintel or panel forming device, compacting the mixture to form a green panel, removing the mold from the green panel as soon as the equipment allows it, protecting the demolded green panel, resting on a pallet, from drafts or dry air for about 15 hours, and curing the panel for at least 28 days.

The invention, as set forth above, is based upon the unexpected recognition that a high level of sound absorption is possible, without the complexity and weight of plural wood concrete layers as in U.S. Pat. No. 4,325,457, by use of a panel having K-X treated aggregates, the panel encasing reinforcements such as steel rods. In particular, Applicants have surprisingly found that, despite the fact that the panels lack the second wood concrete layer of U.S. Pat. No. 4,325,457, low density wood concrete panels using the K-X treated free aggregate actually have a higher noise reduction coefficient (NRC), and easily satisfy the minimum requirement for sound transmission loss (STL) than do the two layer panels of U.S. Pat. No. 4,325,457.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a front elevation view of a sound absorption wall for a highway, formed of sound absorption panels according to the present invention;

FIGS. 3 and 4 are two examples of concrete connection joints and support columns between sound absorption panels according to the present invention; and FIGS. 5 and 6 are two examples of steel connection joints and support columns between sound absorption panels according to the present invention.

DETAILED DESCRIPTION OF THE PREFERRED EMBODIMENTS

Figure 2:
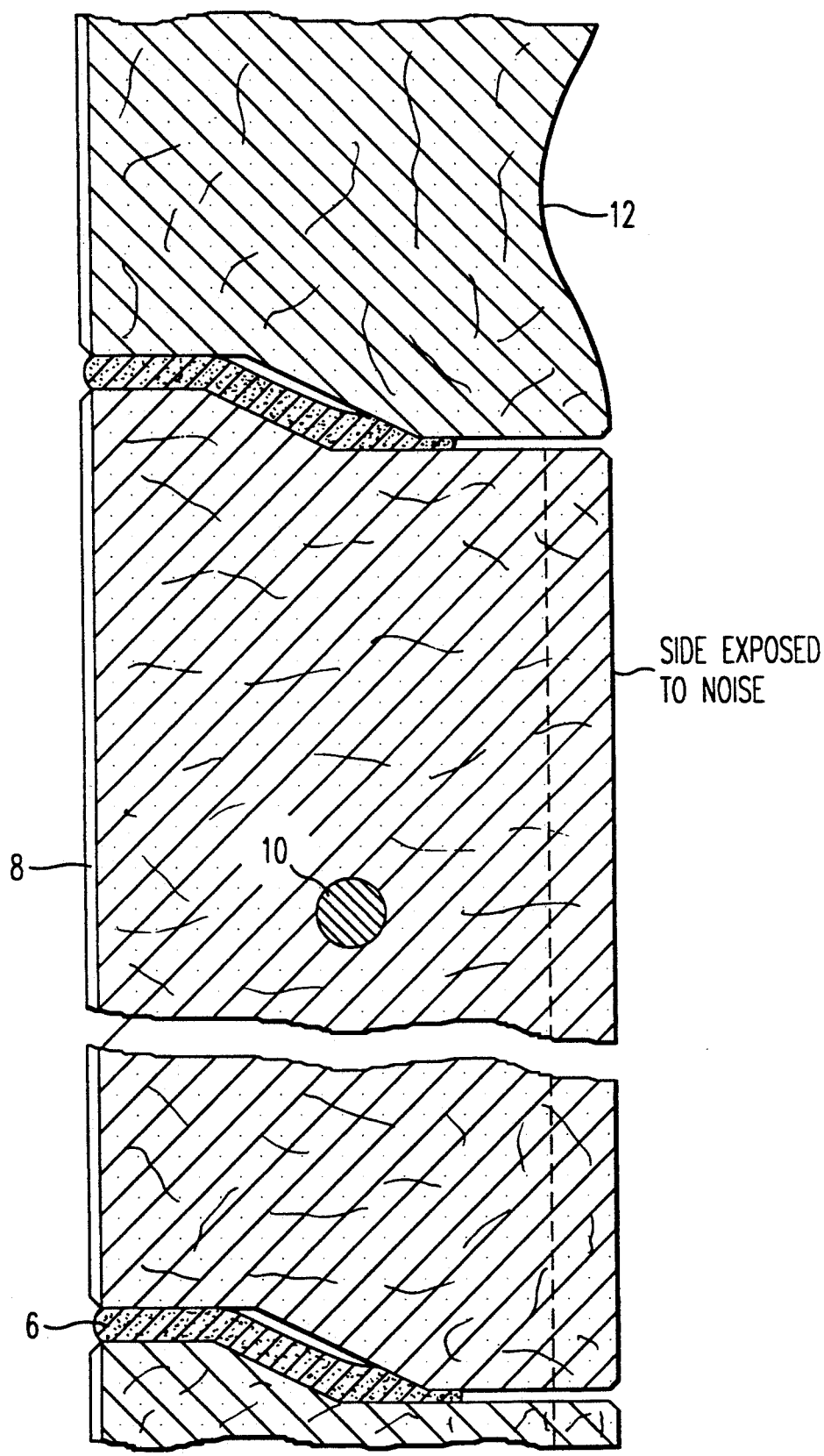
FIG. 2 is a vertical section of sound absorption panels according to the present invention, top on bottom in the formation of a sound absorption wall.

FIG. 1 shows a schematic elevational view of a sound absorption wall for highways, formed of sound absorption panels according to the present invention. Each of the panels 2 forming the wall 4 comprises a monolithic, single wood concrete layer sound absorption panel formed of lightweight wood concrete using K-X treated free aggregates. As is described in U.S. Pat. No. 5,019,170, fibrous organic aggregates, including all kinds of wood chips (pine chips, hardwood chips), recycled wood, straw, reed, cotton stalks, bamboo, peanut shells, other nut shells or rice holes (or shredded pallets) are mineralized with a kaolin coating to a degree sufficient to seal in water soluble organic matter held in the pores of the chips and prevent the leaching thereof, while maintaining the individual chips in a free aggregate form. The K-X treated particles are then mixed with Portland cement and water in a turbine mixture (such as the Smith, Eirich, Rapid, Voeller (TM)) to form a lightweight wood concrete mixture. The high speed turbine mixer accelerates hydration.

According to the present invention this mixture is then placed in the mold of a conventional lintel or panel forming machine such as a Coote Rotascreet TM, Macfab Dual Cost 750 TM, or Fleming Panel King TM, the mold having an appropriate size and shape for the desired end product. For example, for highway panels the end product should be between 9 and 14 feet in length, between 9 inches and 36 inches in width, and should have a thickness of between 3.75 inches and 4.5 inches. Panels used for protective and sound absorption fences for industrial, public and residential areas preferably have a length of 6 to 10 feet, a width of 8 inches to 16 inches, and a thickness of between 2.75 inches and 3.5 inches.

The wood concrete mixture of the K-X treated chips and Portland cement is compacted in the mold, for example by vibration of the table and mold, thus compacting the mixture over the entire length of the panel. Reinforcements, such as epoxy coated steel rods or fiberglass rods or stainless steel rods, as schematically illustrated at 10 in FIG. 2, are preferably positioned within the molds prior to the introduction of the mixture, but can be introduced into the mixture within the molds.

The resulting mixture is permitted to harden for about 1 minute and the resulting green panels are then demolded and set on a pallet for further hardening. A rack loaded with the pallets is preferably moved into a tunnel or covered with plastic in order to make sure that the hydration is not disturbed by dry air, cool air or drafts for the next 15 hours. The panels can be taken from the pallets after 24 hours, but have to be cured during the next 28 days in a vertical position before they can be moved and shipped to the job sites. Curing can occur outside, but in a wind protected area.

The resulting single layer wood concrete panels have both a lighter weight and better sound insulating properties than the two layer panels of U.S. Pat. No. 4,325,457, as evidenced by the following example:

EXAMPLE

A test specimen was assembled from panels according to the present invention. The test specimen was 2.44 m high by 2.74 m long and 10.2 cm thick. The specimen consisted of four stacked panel units, each nominally 61 cm high, 2.74 m long and 10.2 cm thick. Each of the units was a solid K-X treated wood concrete panel made from a free aggregate of pin chips of pine, hard wood or recycled clean wood waste (pallets), mineralized with kaolin according to the K-X process disclosed in U.S. Pat. No. 5,019,170 to make them compatible with Portland cement. The wood concrete mixture was poured into forms of casting equipment and reinforced with epoxy coated steel rods. The casting equipment was designed to provide equal compaction and so vibrated the mix over the entire length of the panel. The panels were poured and allowed to age a minimum of 28 days before being tested. Vertical tongue and groove seams between the panel units were sealed with duct tape. The test specimen consisting of 4 panels weighed 579 kg and had an average density of 86.5 kg/m$^2$ (17.7 lbs/ft$^2$).

The area used in the calculations was 6.7 m$^2$, the room temperature at the time of the test was 21° C. and the relative humidity was 63%.

The sound absorption characteristics of the specimen were then tested. The test method conformed explicitly with the requirements of the ASTM standard test method for sound absorption and sound absorption coefficients by the reverberation room method: ASTMC 423-90a and E795-91. The method of calculation was that described in ASTM STP 15D, as outlined in section 13 of the standard. The test results are shown in Table 1:

TABLE 1

| ⅓ Octave Center Center Frequency (Hz) | Absorption Coefficient | Total Absorption In Sabins | % of Uncertainty With 95% Confidence Limit With Specimen |
|---|---|---|---|
| 100 | 0.29 | 21.08 | 3.14 |
| ** 125 | 0.31 | 22.30 | 2.77 |
| 160 | 0.34 | 24.61 | 2.32 |
| 200 | 0.45 | 32.37 | 1.91 |
| ** 250 | 0.61 | 44.19 | 1.68 |
| 315 | 0.94 | 67.51 | 1.29 |
| 400 | 1.06 | 76.34 | 1.33 |
| ** 500 | 1.11 | 79.99 | 1.28 |
| 630 | 1.00 | 71.87 | 0.95 |
| 800 | 0.84 | 60.23 | 0.78 |
| ** 1000 | 0.77 | 55.35 | 0.71 |
| 1250 | 0.79 | 57.14 | 0.64 |
| 1600 | 0.90 | 65.14 | 0.59 |
| ** 2000 | 0.90 | 64.74 | 0.51 |
| 2500 | 0.89 | 64.15 | 0.56 |
| 3150 | 0.88 | 63.54 | 0.49 |
| ** 4000 | 0.88 | 63.24 | 0.41 |
| 5000 | 0.88 | 63.39 | 0.55 |

NRC = 0.85

The noise reduction coefficient NRC is defined as the average of the coefficients at 250, 500, 1000 and 2000 Hz, expressed to the nearest integral multiple of 0.05. It can be seen from Table 1 that the NRC of the panel was 0.85. This can be compared to the panel of U.S. Pat. No. 4,325,457, in which a 10 cm thick panel had a density of 20 lbs/ft$^2$ and a noise reduction coefficient of only 0.72. It can therefore be seen that, for a given panel thickness, the present invention produces a lighter weight panel having a greater noise reduction coefficient. Moreover, this is done without the need to form a laminate as in U.S. Pat. No. 4,325,457.

A 10.2 cm thick panel according to the invention was also tested for sound transmission loss and was found to have a sound transmission class (STC) of 47 according to ASTM standard E 90-90.

Referring to FIGS. 1 and 2, laterally adjacent panels can be separated by a neoprene type fiber seal 6, and the back face of the panels can optionally be painted with fiber reinforced sealing paint 8 to make them more airtight.

The front surfaces 12 of the panels, on the other hand, which are to face the noise sources, can have decorative pattern designs or be corrugated. They can also be dyed with certain colors. A decorative pattern could also be applied to the backside by laying the green panels on a pallet having a pattern. This pattern would help compact the green panel.

FIG. 2 shows in a vertical section the top and bottom surfaces of the panels, as it can be profiled to provide an interlock, for example in the same way as in U.S. Pat. No. 4,325,457. Similarly, the joints between lateral panels can be supported by vertical concrete or steel columns embedded in the wall foundations. A plan view of an I-section concrete column is shown at 14 in FIG. 3 while an S-section concrete column is shown at 16 in FIG. 4. I and S section steel columns are respectively shown in FIGS. 5 and 6. Neoprene profile member 18 can be positioned behind the panels having concrete columns (i.e., at a side opposite that facing the source of noise) to absorb any vibrations of the panels and prevent their movement with respect to the columns. Steel or plastic profile members 19 are provided with the steel columns, for the same purpose.

The panels can be cut to size at the job site.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing a single wood concrete layer sound absorption panel having a noise reduction coefficient of at least about 0.85, comprising the steps of:

forming a mixture of a free aggregate of kaolin mineralized organic fiber chips with Portland cement and water;

casting the mixture into a mold of a lintel or panel forming device;

compacting the mixture to form a green panel;

immediately removing the green panel from the mold;

placing the green panel on a pallet;

protecting the demolded green panel from drafts or dry air for about 15 hours; and curing the demolded panel for at least 28 days and thereby producing the single wood concrete layer sound absorption panel having a noise reduction coefficient of at least about 0.85.

2. The process of claim 1, wherein the cured panel has a thickness of about 10 cm and a density of 84.8 $kg/m^2$.

3. The process of claim 1, wherein the protecting step comprises covering the demolded green panel with plastic.

4. The process of claim 1, wherein the protecting step comprises placing the demolded green panel in a drying tunnel.

5. The process of claim 1 wherein the forming step comprises mixing in a high speed turbine mixer.

6. The process of claim 1, wherein the cured panel has a thickness of from 6 to 10 cm for use as a privacy fence or security wall.

* * * * *